No. 725,363. PATENTED APR. 14, 1903.
N. B. POWTER.
PROCESS OF TREATING OIL BEARING MATERIALS.
APPLICATION FILED APR. 24, 1901. RENEWED JAN. 27, 1903.
NO MODEL.
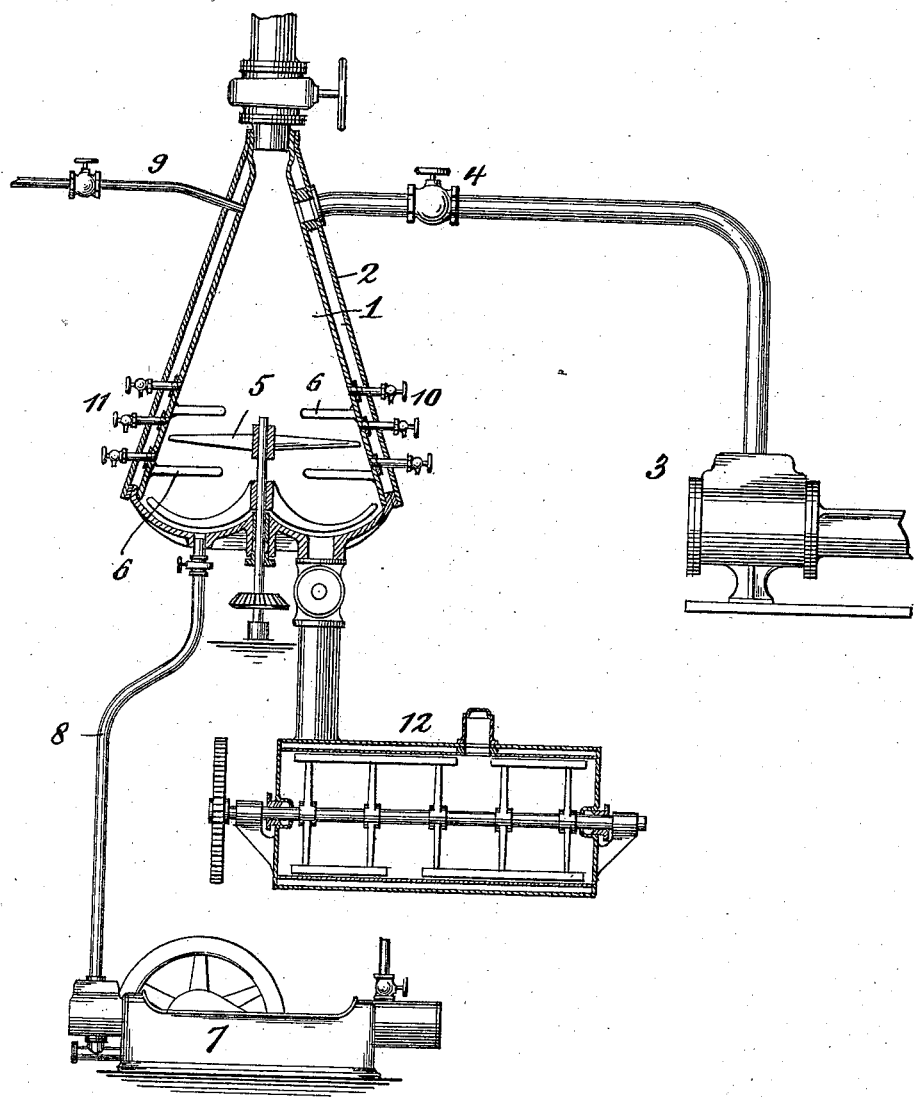
WITNESSES:
INVENTOR
Nathaniel B. Powter
BY
E. M. Marble & Son
HIS ATTORNEYS

UNITED STATES PATENT OFFICE.

NATHANIEL B. POWTER, OF BROOKLYN, NEW YORK, ASSIGNOR TO THE POWTER COMPANY, OF NEW YORK, N. Y., A CORPORATION OF NEW JERSEY.

PROCESS OF TREATING OIL-BEARING MATERIALS.

SPECIFICATION forming part of Letters Patent No. 725,363, dated April 14, 1903.

Application filed April 24, 1901. Renewed January 27, 1903. Serial No. 140,811. (No specimens.)

*To all whom it may concern:*

Be it known that I, NATHANIEL B. POWTER, a subject of the King of Great Britain, residing at Brooklyn, in the county of Kings and State of New York, have invented certain new and useful Improvements in Processes of Treating Oil-Bearing Substances; and I do hereby declare the following to be a full, clear, and exact description of the invention, such as will enable others skilled in the art to which it appertains to make and use the same.

My invention relates to the treatment of oil-bearing substances, and particularly to the treatment of substances having solids, water, and oil in their composition.

My invention consists in a new and improved process wherein the substance to be treated is subjected to the action of compressed air and heat in a closed vessel.

My invention also consists in first heating the material while under a pressure less than that of atmospheric pressure, and, second, in heating the mass while under a pressure greater than that of atmospheric pressure.

My invention further consists in agitating the material while treating it and in applying water to the mass after the oil which was separated from the solid material during its treatment under pressure has been removed, and my invention consists in further details in a process which will hereinafter be more fully set forth.

The objects of my invention are, first, to treat oil-bearing material in such manner as to separate the oils from the solids without the addition thereto of a large quantity of free water, as heretofore; second, to separate the oils from the solids without permitting glues, gelatins, isinglass, or the like contained therein to go into solution with the oils; third, to separate the glues, gelatins, and isinglass, &c., from the solids after the oils have been removed therefrom, and, fourth, to simplify the treatment of oil-bearing materials and to separate the oil therefrom in as pure condition as possible.

Other objects of my invention will appear in the following detailed description.

In carrying out my process in full I first insert a charge of the material in a closed vessel and then apply heat and suction simultaneously to the mass. The heat will drive off the water in the material in the form of vapor and steam, which will immediately be removed by the action of the suction. The material being in partial *vacuo*, the steam will be liberated at a low temperature, which is extremely desirable, and in each case the degree of vacuum employed will be sufficient to prevent evaporation of the moisture at a temperature too low to injure in any way the resulting product. It is also desirable that the steam and water vapors be removed immediately they are evolved, particularly in treating certain substances, such as fish material, as otherwise the glues, gelatins, isinglass, &c., contained therein will go into the solution and will not only injure the oil, which it is desired to remove in a comparatively pure state, but a valuable commodity will be lost. Thus in the first part of my process I drive off the water while holding back the oils, glues, &c. The next step in the process after the water has been removed is to close the suction and introduce air under pressure and simultaneously to apply heat. The heat applied at this stage of the process will probably be considerably greater than that applied in the former step just described and may range from 200° to 300° Fahrenheit or even more, according to the temperature which the material treated is capable of withstanding, without injury to the resulting product. I also preferably subject the mass to agitation in order to disintegrate by force the cellular structure thereof to assist in the release of the grease and oil. During this stage of the process the grease and oil will be separated from the solid material, and the glues, gelatins, and isinglass, if preserved, will remain with the other solids, for the reason that they will not go into the solution without water. The grease and oil having been separated may be removed in any desired manner and the residue treated as desired. Should the material be such as to contain glues, gelatins, isinglass, &c., the next step in the process may be the introduction of water and the application of sufficient heat to the mass to dissolve the said glues, gelatins, isinglass, &c., which may then be removed, and the residue may be dried out in any suitable manner. Should the substance treated be such as to contain no glues, gelatins, isinglass, &c., the said step in the process may be omitted, and the residue may be dried out immediately the grease and oil have been removed.

In the drawing herewith I have shown somewhat diagrammatically a form of apparatus in which my improved process may be carried out.

A closed vessel or digester in which the material may be treated is shown and is designated by the reference character 1. Such vessel is provided with a steam-jacket 2 for the purpose of applying heat to the contents. A vacuum-pump 3 is shown connected to the upper end of the vessel by means of a pipe 4. The vessel is provided with rotating, stirring, or agitating blades 5 and with stationary blades 6, which assist in the disintegration of the material under treatment. An air-compressor is shown at 7 and communicates with the interior of the vessel through a pipe 8. In delivering the compressed air from the compressor I preferably dispense with the cylinder water-jacket or other cooler usually employed and utilize the heat of compression to assist in the treatment within the vessel 1. A discharge-pipe for the compressed air is shown at 9.

I have provided means for removing the oil after it has been separated from the solid material in a series of oil-taps 10, and while such taps would not be a preferred form of means for removing oil such taps illustrate one form of simple means, and hence is sufficient for purposes of this specification, the invention herein relating entirely to a process and in no way to the apparatus shown. In like manner I have shown a plurality of glue-taps 11, through which the glue liquors and the like may be drawn off.

A drier 12 is shown and is in direct communication with the lower end of the vessel 1, and the residue from the said vessel may be discharged directly into the said drier and there dried out.

The foregoing is of course but one form of apparatus in which my new and improved process may be carried out.

What I claim is—

1. The herein-described process of treating oil-bearing substances which consists in first heating a mass of the material to be treated while under a pressure less than that of atmospheric pressure, and second in heating the mass to a higher temperature while subjected to pressure by a dry compressed gas.

2. The herein-described process of treating oil-bearing substances which consists in first heating a mass of the material to be treated and driving off the water therein and simultaneously applying suction thereto, second in heating the mass in the presence of a dry compressed gas, third in removing and collecting the oil separated out during the second step of the process, and fourth in drying the residue.

3. The herein-described process of treating oil-bearing substances which consists in first heating a mass of the material to be treated and simultaneously applying suction thereto, second in heating the mass in the presence of a dry compressed gas, third in removing and collecting the oil separated out during the second step of the process, and fourth in adding water to the residue to dissolve glues and other soluble products remaining in the material.

4. The herein-described process of treating oil-bearing substances which consists in first heating a mass of the material to be treated and simultaneously applying suction thereto, second in the heating of the mass in the presence of compressed air, third in removing and collecting the oil separated out during the second step of the process, fourth in adding water to the residue, fifth in removing and collecting the water, and any portion of the material in solution therein, and sixth in drying the residue.

In testimony whereof I affix my signature in the presence of two witnesses.

NATHANIEL B. POWTER.

Witnesses:
D. HOWARD HAYWOOD,
A. H. PERLES.